2,737,529
PURIFYING PENTACHLOROTHIOPHENOL

Harris Walton Bradley, Wilmington, Del., assignor to E. I. du Pont de Nemours and Company, Wilmington, Del., a corporation of Delaware No Drawing. Application December 1, 1954,
Serial No. 472,523

4 Claims. (Cl. 260—609)

This invention relates to a process for the purification of pentachlorothiophenol, and more particularly to the separation therefrom of small amounts of tetrachlorobenzene dithiol.

Pentachlorothiophenol and its zinc salt are useful as peptizing agents for natural and synthetic elastomers, as disclosed in British Patent 715,314. Polychlorothiophenols containing two SH groups are also known to be effective peptizing agents for natural and synthetic elastomers, as disclosed in the copending application of Joseph Pikl Serial No. 346,020, filed March 31, 1953. A process of preparing both pentachlorothiophenol and the related dithiols is disclosed in this Pikl application, which consists in reacting a chlorobenzene containing at least 4 chlorine atoms with an alkaline metal sulfhydrate the reaction being carried out in a solvent or a mixture of solvent which dissolves a substantial amount of the reacting ingredient. The reaction is completed in from about 1 to 12 hours and carried out at temperatures from about 100° to 170° C. The products are isolated by drowning the mass in water and distilling off the solvent. The remaining aqueous solution containing the alkali metal salt of the desired thiophenol is filtered to remove insoluble materials that precipitate, and the product then is precipitated with acid. Alternately, the thiols are converted to their zinc salts, which are also desirable peptizing agents.

In carrying out this process for the preparation of pentachlorothiophenol, some aromatic dithiol is normally formed and minor amounts (about 1% to 2%) of aromatic dithiol by-product remain in the finished pentachlorothiophenol. Since both the tetrachlorobenzene dithiol and phentachlorothiophenol are active peptizing agents, this small amount of dithiol impurity would not be expected to cause any serious deficiency in the peptizing activity of pentachlorothiophenol. It has been found, however, that when pentachlorothiophenol contains about 1% to 2% of the dithiol the peptizing activity of pentachlorothiophenol is markedly decreased. Repeated crystallization of pentachlorothiophenol containing the dithiol impurity fails to make a separation. The melting point determinations do not distinguish between the pure and impure material.

It is the object of this invention to provide a simple and commercially feasible process for the purification of pentachlorothiophenol whereby it is freed from tetrachlorobenzene dithiol, and thereby provide a product which has exceptionally good peptizing activity when incorporated into natural and synthetic elastomers.

The process of this invention consists in treating an alkaline aqueous solution of pentachlorothiophenol, containing minor amounts of dithiol impurities, with a metal cation selected from the group consisting of manganese, iron, cobalt, nickel, copper, cadmium, tin and lead, and, after filtering the reaction mass, to remove the metal salt of the dithiol, acidifying the filtrate to produce the essentially pure pentachlorothiophenol.

The impure pentachlorothiophenol in alkaline solution can be treated with the metal cation as a separate step, or, preferably, this purification step can be combined with the process of preparing the pentachlorothiophenol. An alkaline solution of the pentachlorothiophenol, which contains the undesired chlorobenzene dithiol, is treated under agitation with the metal cation as a salt or hydroxide, and after the reaction mass is allowed to stand for about one-half to one hour at room temperature or somewhat elevated temperatures, the insoluble material is filtered off and the filtrate is acidified to recover the pure pentachlorothiophenol.

The metal cation used may be any member of the class consisting of manganese, iron, cobalt, nickel, copper, cadmium, tin and lead, and either the higher or lower valence states of these metals are operable. The metal cation can be used in the form of salts or hydroxides, although the water-soluble metal salts are preferred. The metal salts may be anhydrous or hydrated and may be either halides such as chlorine, bromine and iodine, or sulfates, nitrates, or salts of organic radicals such as oxalates, acetates, formates, etc. The insoluble metal compounds such as hydroxides are also operable, such as ferrous hydroxide, tin hydroxide, cupric hydroxide, etc.

The amount of metal cation used in the purification process will normally be no greater than ten times the molar amount of dithiol present. Use of more than this amount is uneconomical and adds nothing to the process. On the other hand, the minimum amount of reagent that should be used is the stoichiometric amount required to react with the dithiol present in the pentachlorothiophenol being purified. When less than the stoichiometric amount is used, purification will be incomplete. Even when using as much as ten times the molar amount of dithiol present, the pentachlorothiophenol is not pecipitated and no appreciable loss of pentachlorothiophenol is experienced in the purification process. While the amount of dithiol present in the pentachlorothiophenol may be determined in advance and stoichiometric amounts of the metal ion used, the wide latitude of ten times the molar amount gives sufficient latitude that preliminary analysis is unnecessary, for in the process as above described the amount of dithiol present does not usually exceed 2% of the total solids.

After the metal reagent has been added to the alkaline solution of the pentachlorothiophenol, the reaction mixture is normally agitated for about from one-half to one hour. This agitation may be carried out at room temperatures (i. e., about 20° C.) or at temperatures up to about 75° C., after which the reaction mass is filtered and the undesired dithiol is retained on the filter as its metal salt. While higher temperatures may be employed, they are not required.

As already indicated, the pentachlorothiophenol is recovered from the filtrate by the addition of acid. Normally this acidification step is carried out by adding the alkaline solution of the pentachlorothiophenol to a dilute mineral acid solution (preferably dilute sulfuric acid at about 5% to 2% concentration) at about 70° to 80° C. over a thirty minute period. Immediately after the precipitation of pentachlorothiophenol it is filtered off, washed free of acid with water, and dried at about 100° C. It is then ready for use as a peptizing agent in natural and synthetic elastomers, or it may be converted to the zinc salt which is also a peptizing agent.

*Example 1*

A charge of 272 parts of hexachlorobenzene, 206 parts of sodium sulfhydrate (70% flakes), and 387 parts of methanol is heated with moderate agitation to 130° C. over a period of four hours in a stainless steel autoclave. The reaction mass is held to 135° C. for another hour and then cooled to 95° C. over a four hour period. During this reaction a maximum pressure of about 180 p. s. i. is developed. The autoclave is vented and a solution of 250 parts of water and 66 parts of 30% sodium hydroxide solution is added, and the charge removed by suction from the vessel. The charge is then diluted with 1650 parts of water and allowed to stand for about 45 minutes, after which 25 parts of insoluble material (largely hexachlorobenzene) is removed by filtration.

The alkaline filtrate is added to an excess of dilute sulfuric acid (about 10% by weight) at a temperature of about 70° to 80° C. over a 30 minute period. The precipitated pentachlorothiophenol is obtained in 90% yield after filtration, and after washing free of acid with water, is dried at 100° C. Analysis shows that this product contains approximately 1.0% of dithiol. It melts at 230° C. This is designated as Sample A in the following table. Recrystallization from toluene raises the melting point to 243° C. but does not remove the dithiol present.

The pentachlorothiophenol as obtained may be purified as follows:

A solution of 300 parts of water and 66 parts of 30% sodium hydroxide is prepared and 20 parts (approximately 0.001 mol of tetrachlorobenzenedithiol) of the impure pentachlorothiophenol is added. This mixture is heated to about 55° C. until the thiophenol is dissolved to give a clear brown solution. A solution of 2 parts of $FeCl_2 \cdot 4H_2O$ (0.01 mol) in 25 parts of water is added to the pentachlorothiophenol solution at 50° C. After standing for 20 minutes the mixture is filtered from the dark insoluble residue which forms, and the alkaline filtrate is added to an excess of dilute sulfuric acid at about 50° C. to precipitate approximately 20 parts of the purified pentachlorothiophenol. This product melts at 230° C., and upon analysis shows no dithiol present.

The peptizing activity of a sample of purified pentachlorothiophenol so prepared was determined by milling into a 100 parts of smoked sheet (natural rubber), 0.25 part of purified pentachlorothiophenol. This was done on a 6" x 2" laboratory mill for 10 minutes at 135° C. The Williams plasticity and recovery value are listed in the following table, and for comparison a control sample, as well as a sample of pentachlorothiophenol containing 1% dithiol (Sample A) and a sample containing 2% dithiol is given:

| Sample | Plasticity | Recovery |
| --- | --- | --- |
| Control (milled with no peptizer) | 197 | 83 |
| 100% Pentachlorothiophenol | 50 | 2 |
| 99% Pentachlorothiophenol+1% dithiol (Sample A) | 95 | 7 |
| 98% Pentachlorothiophenol+2% dithiol (Sample A) | 98 | 2 |

These tests show that the efficiency and effectiveness of the pentachlorothiophenol peptizing agent is greatly enhanced by treatment with the iron salt. They further show that as the amount of dithiol in the pentachlorothiophenol increases, the plasticizing effectiveness of the composition decreases.

Example 2

A reaction product from an autoclave reaction of hexachlorobenzene, sodium sulfhydrate and methanol, similar to that described in Example 1, is split into approximately equal parts, A and B, one part being purified by the process of this invention.

Portion A (564 parts) is diluted with 415 parts of water, allowed to stand 45 minutes, filtered from 3 parts insoluble matter, and precipitated with dilute sulfuric acid. After washing with water, it is dried at 100° C. One hundred and seventy (170) grams of pentachlorothiophenol is obtained, and this product shows by analysis 1.7% dithiol. This is designated Product A.

Portion B (578 parts) is diluted with 415 parts of water and 10 parts of ferrous chloride tetrahydrate crystals is added. The charge is agitated for 45 minutes, filtered from 23 parts of insoluble material, and converted to the pentachlorothiophenol with acid as described in Example 1. One hundred and sixty-nine (169) grams of product is obtained that shows by analysis no dithiol present. This is designated Product B.

Peptizing activity tests, made on smoked sheet under the conditions described in Example 1, shown below, indicate the superiority of the material treated with iron salt.

| Parts Peptizer/100 Parts Elastomer | Plasticity | Recovery |
| --- | --- | --- |
| 0.15 part Product A | 117 | 18 |
| 0.15 part Product B | 78 | 1 |
| 0.25 part Product A | 101 | 8 |
| 0.25 part Product B | 69 | 1 |

Example 3

Pentachlorothiophenol containing 2% tetrachlorobenzene dithiol is dissolved in dilute sodium hydroxide solution. Portions of this solution are treated separately as described in Example 1 with aqueous solutions of the following inorganic salts. (An amount of salt equivalent to 0.1 mol of impure pentachlorothiophenol used is taken in each case.)

$CdCl_2$
$COCl_2 \cdot 6H_2O$
$CuSO_4 \cdot 5H_2O$
$Pb(NO_3)_2$
$MnSO_4$
$FeSO_4 \cdot 7H_2O$
$NiSO_4 \cdot 6H_2O$
$FeCl_3 \cdot 6H_2O$
$SnCl_2$ Regeneration of the pentachlorothiophenol as in previous examples gives in each case an excellent yield of product which is essentially free of dithiol (it contains less than .01%) and which shows peptizing activity in smoked sheet much superior to the starting material containing 2% dithiol.

Example 4

A solution of 4 parts of pentachlorothiophenol containing 2% tetrachlorobenzene dithiol is prepared by dissolving it in a mixture of 1.7 parts of 30% sodium hydroxide solution and 150 parts of water. A 5 part portion of this solution is acidified and the impure pentachlorothiophenol recovered.

The remaining portion is treated with a slurry of iron hydroxide prepared by dissolving 0.5 part of $FeSO_4 \cdot 7H_2O$ in 20 parts of $H_2O$ and adding NaOH solution until all the mixture is alkaline to phenolphthalein. After the addition of iron hydroxide, the mixture is heated to 80° C., agitated for 30 minutes and then cooled to 30° C. After filtration the filtrate is acidified with dilute $H_2SO_4$ and the pure pentachlorothiophenol filtered off, washed with water and dried.

Analysis shows no dithiol in the iron hydroxide treated product. The pure pentachlorothiophenol so obtained shows much better peptizing activity on smoked sheet than the impure pentachlorothiophenol isolated before the iron hydroxide treatment.

I claim:
1. A process for purifying pentachlorothiophenol containing some benzene dithiols, which comprises treating an alkaline solution of the impure pentachlorothiophenol with a metal cation of the group consisting of manganese, iron, cobalt, nickel, copper, cadmium, tin and lead, and filtering the solution to remove the metal salt of the dithiols.

2. A process for purifying pentachlorothiophenol containing some benzene dithiols, which comprises treating an alkaline solution of the impure pentachlorothiophenol with a metal cation of the group consisting of manganese, iron, cobalt, nickel, copper, cadmium, tin and lead, filtering the solution to remove the metal salt of the dithiols, acidifying the filtrate to precipitate the pentachlorothiophenol, and filtering and washing the precipitated material.

3. The process of claim 1 in which the metal cation is added in the form of a water-soluble metal salt and the treating is carried out at a temperature of from 20° C. to 75° C.

4. The process of claim 1 in which the alkaline solution of the pentachlorothiophenol is treated with a water-soluble iron salt.

No references cited.